June 5, 1956  R. LOW  2,749,063
EJECTOR MECHANISM
Filed Sept. 23, 1954
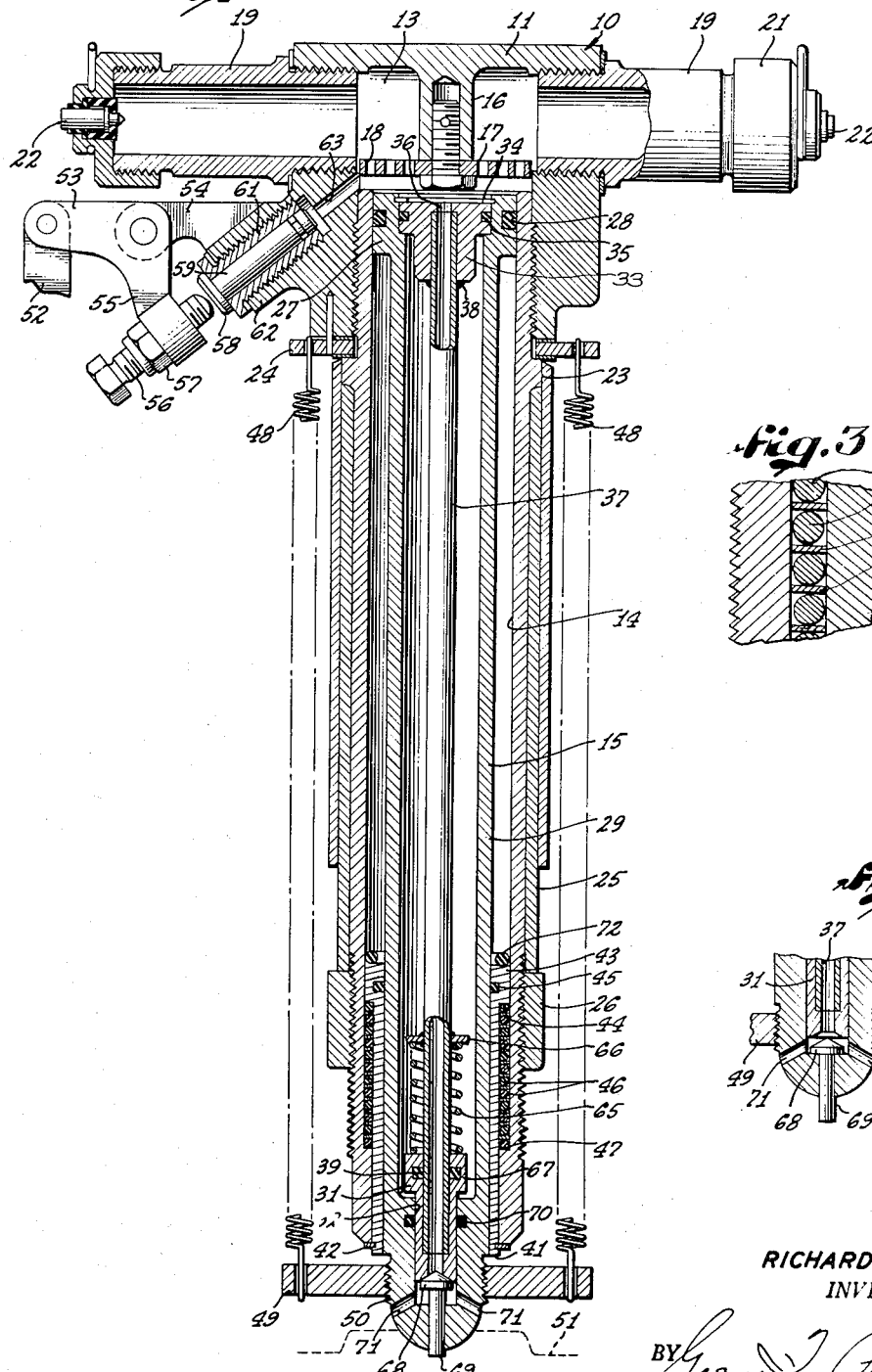
RICHARD LOW,
INVENTOR.
BY George J. Smyth
ATTORNEY.

United States Patent Office 2,749,063
Patented June 5, 1956

2,749,063

EJECTOR MECHANISM

Richard Low, Los Angeles, Calif., assignor to Pastushin Aviation Corporation, Los Angeles, Calif., a corporation Application September 23, 1954, Serial No. 457,823

9 Claims. (Cl. 244—137)

This invention relates to means on an aircraft for releasably mounting an external store such a jettisonable fuel tank or other body and for ejecting the body from the aircraft with force created by abruptly rising fluid pressure.

In present day aircraft construction such stores as jettisonable fuel tanks are held to a pylon or the like usually carried by the aircraft through latch mechanisms remotely operable by the pilot. These latch mechanisms, when operated, permit the jettisonable fuel tank to be forced from its position through the ejective force. In a typical arrangement for this purpose, the steep-front pressure rise is created by detonating an explosive charge to generate rapidly expanding gases in a combustion chamber. A small cylinder in communication with the combustion chamber houses a small piston to provide the force which operates means releasing the latch mechanism holding the jettisonable body to the aircraft. A larger outwardly directed power cylinder in communication with the combustion chamber houses a power piston to concurrently apply the desired ejective force against the body to jettison the same.

In many prior ejector mechanisms of the type herein shown, the power piston was also jettisoned with the external store. The loss of the piston at each ejection not only was an economical loss, but also greatly complicated the service and maintenance of the ejector mechanism in that it was necessary to store a supply of pistons at each operating base.

It was then proposed to mount the piston so that the latter was not jettisoned with the store, but remained with the ejector mechanism after the explosive charges were detonated. This was brought about by providing means for holding the piston against separation from the cylinder in which it operated and supplying springs or the like to return and hold the piston in a normal operable position within the cylinder. To return the piston within the cylinder it was necessary to vent the cylinder after each operation of the piston, for otherwise the gases were compressed by the piston and the piston would fail to return.

In some prior installations, venting means were provided through the use of a hollow piston having a valve mechanism carried adjacent the combustion chamber and which was opened by predetermined movement of the piston under the steep-front pressure rise produced by the detonated charges. As it was found impossible to produce a complete burning of the combustible grains of the explosive charge at the time the cartridges were detonated, the unburned grains, at the time the piston was returned, continued to burn to produce periodic explosions. The periodic explosions thus produced resulted in the piston reciprocating in the cylinder to periodically open and close the valve mechanism until all of the explosive charges had been completely detonated.

This difficulty is obviated by the present invention for in the ejector mechanism herein shown, the valve is carried by the end of the power piston engaged with the store and this valve mechanism is held closed so long as the store is mounted to the aircraft. Once the store has been jettisoned, the valve is automatically opened and held open until a store is again mounted through the latch mechanisms to the aircraft.

To obviate the loss of ejection force by reason of the expansion chamber formed by a hollow piston, the present invention provides means carried internally of the power piston which defines a passageway flow-connected to the combustion chamber at the one end of the piston and closed by the valve mechanism at the opposite end. Although the piston of the present invention has been formed as a hollow element, there is no loss of the ejection force, for the relatively large chamber formed internally of the piston is sealed against expanding gases to insure a piston having a low inertia and low momentum. As the piston has a low momentum it is more easily decelerated at the end of the explosion cycle and without a relatively high impact shock to the ejector mechanism.

Other features and advantages of the present invention will be hereinafter apparent from the following description, particularly when taken in connection with the accompanying drawing, in which Figure 1 is a sectional view of the ejector mechanism of the present invention showing the valve mechanism in the closed position;

Figure 2 is a fragmentary sectional view of the mechanism showing the valve in the open position; and Figure 3 is an enlarged sectional detail of Figure 1.

The ejector mechanism of the type herein shown is one which may be mounted on the underside of the wing of an aircraft and carried internally of a pylon in which is mounted the latch mechanism for holding the external store to the aircraft. The ejection mechanism is not necessarily limited to such installation, however, for it can be used in any installation wherein a power piston is employed to exert a thrust to jettison the store.

The ejector mechanism of the present invention, referring now to Figure 1 of the drawing, comprises a body member 10 including a forging or the like 11 having internal wall means defining a combustion chamber 13. The mechanism further includes a power cylinder 14 in communication with the combustion chamber and a power piston 15 operable in the power cylinder 14. In the construction shown, the hollow forging 11 is formed with a finger or boss 16 on which is mounted a suitable baffle plate 17 that separates the interior of the combustion chamber 13 from the interior of the power cylinder 14. The baffle plate 17 is formed with a plurality of apertures 18 of a size sufficiently small to prevent grains of explosive material entering the power cylinder 14.

A pair of fittings 19, having tool engaging hexagonal flanges, are threaded into tapped openings formed in the forging 11 at opposite sides of the combustion chamber to hold explosive charges in the form of cartridges, not shown, and each of the fittings 19 is closed by a cap 21 carrying an insulated firing contact 22. The cartridges are detonated by actuation of the contacts 22, controlled by a conventional firing circuit, not shown, and forming no part of the present invention.

The power cylinder 14 is formed with external threads at the one end thereof to permit the power cylinder to be threadedly mounted in a tapped bore provided in the forging 11 to thus dependently mount the power cylinder from the forging. The power cylinder is formed adjacent the external threads with a hexagonal flange 23 forming tool-engaging surfaces to facilitate rotation of the cylinder during the mounting operation. The flange 23 also forms a bearing shoulder to engage against a flat annular member 24 which is clamped against the lower face of the forging once the power cylinder is mounted thereto. This flat annular member is slipped over the threaded end of the cylinder before this end is threadedly engaged with the tapped bore and will be compressively engaged between the lower face of the forging 11 and the hexagonal flange 23 once the power cylinder is mounted in position.

The ejector mechanism, in the illustrated embodiment of the invention, is mounted within the pylon by being axially fitted within a sleeve 25 carried internally of the pylon and forming a component part thereof. With the power cylinder mounted within the sleeve 25, it is held against longitudinal movement by a large nut 26 threaded onto the normally lower end of the cylinder to compressively engage the sleeve 25 against the hexagonal flange 23.

The piston 15 operating within the power cylinder 14, in the illustrated embodiment of the invention, comprises a head element 27 having a diameter to snugly engage the internal cylindrical wall surface of the cylinder 14. The head element is formed with a peripheral groove mounting an O-ring 28 to seal the annular space between the head 27 and the inner wall surface of the cylinder 14. The head element 27 coaxially mounts a depending elongate skirt or sleeve 29, the lower end of which, as viewed in Figure 1, carries a hollow plug 31 slidably mounted in a bore 32 formed in the end wall of the sleeve 29 closing the lower end of the same.

The head member 27 is provided with a longitudinally extending passage having a counterbore forming an annular shoulder seating a plug 33. The plug 33 is normally held engaged with the shoulder by a fastener 34 such as the snap ring illustrated in Figure 1. An O-ring 35 held in a peripheral groove formed in the plug 33 seals the counterbore and passage of the head 27. A passage 36 coaxially extends through the plug 33 and the one end thereof receives an elongate tubular member 37 coaxially extending of the sleeve 39 and held to the plug 33 by welding, indicated at 38. The interior of the tubular member is flow-connected to the passage 36 which, as seen in Figure 1, leads to the end of the power cylinder immediately adjacent the combustion chamber. The normally lower end of the tubular member 37 is slidably received within a bore formed in the plug 31, the latter carrying an internal O-ring 39 engaged with the tubular member 37 to seal the bore in which the latter is mounted.

It will now be seen that the piston 15 comprises the head element 27, the skirt or sleeve 29 integral therewith, and the tubular member 37. The relatively large annular chamber formed by the inner wall surface of the sleeve or skirt 29 and the outer wall of the tubular member 37 is sealed against expanding gases and consequently does not decrease the steep-front pressure rise generated by the detonated cartridges. This construction results in a piston having a low inertia and a low momentum for its overall size and strength.

Mounted within the lower end of the power cylinder 14 is a sleeve 41 which snugly engages the lower end of the sleeve 29. The sleeve 41 carries a stop element 42, here shown as a flat ring element, mounted in a groove formed in the exterior wall surface of the sleeve 29 adjacent the lower end thereof. The stop 42 limits inward movement of the sleeve 41 to the preselected position shown in Figure 1 of the drawing. The sleeve 41 is formed with an annular flange 43 providing a downwardly facing annular shoulder 44 adjacent the inner end of the sleeve. The flange 43 mounts an internal O-ring 45 for sealing the annular space between the sleeve 41 and the elongate sleeve or skirt element 29 integrally carried by the head element 27. A plurality of rings 46 of resilient material and circular cross-section circumscribing the sleeve 41 and supported by an inturned shoulder 47 formed at the lower end of the power cylinder 14, resiliently supports the sleeve 43 within the normal lower end of the power cylinder. To separate the rings 46 and to increase the resilient support afforded thereby, it is now preferred to mount flat annular washers 46a of a suitable material, such as nylon, intermediate the rings 46, as shown in Figure 3.

It should now be seen that the sleeve 41 forms a means for holding the piston against separation from the cylinder for the flange 43 limits outward movement of the piston head. As the piston head moves into engagement with end face of the flange 43, the sleeve 41 will move downwardly in the cylinder only the distance permitted by compressive flow of the material of the rings 46. Once the material of the rings 46 has been compressed, the sleeve 41 forms a rigid stop means and limits outward movement of the piston in the power cylinder.

The piston is normally held in the elevated position shown in Figure 1 by a plurality of coiled springs 48 mounted between the flat annular member 24 and a similar element 49 threadedly mounted to a projection 50 carried by the lower wall of the skirt 29. The projection 50 is adapted to be engaged in a thrust pad or the like carried by a store indicated by the broken line showing at 51. The projection 50 thus directly applies the ejection force to the store. Although the springs 48 normally hold the piston in the elevated position of Figure 1, they will, nevertheless, permit downward movement of the piston assembly by a pressure rise produced by detonation of the cartridges mounted in the fittings 19 through the firing pin 22.

The ejector mechanism of the present invention is intended to be used in installations where the external store 51 is held to the pylon through latch mechanism, not shown, but operable to releasably engage fitting carried by the store to hold the latter to the pylon. Such latch mechanism is illustrated in the copending application David W. Murphy Ser. No. 407,991, filed February 3, 1954, and is actuated to release position by linkage including a link 52 pivotally connected at one end thereof to an arm 53 of a bell-crank pivotally mounted between a pair of ears 54 carried by the forging forming the combustion chamber. The other arm 55 of the bell-crank threadedly mounts a screw 56 which may be held in any desired position of axial adjustment by a suitable locking nut 57.

The one end of the screw 56 is engaged by an enlarged head 58 of an auxiliary piston 59. This piston operates in a cylinder 61 provided by an insert threadedly mounted in a tapped bore formed in a boss 62 integral with the forging 11. The tapped bore communicates with the combustion chamber by way of a drilled passage 63 and the piston 59 is thus urged outwardly by the pressure rise produced by the cartridges when detonated. This outward movement of the piston 59 applies a thrust to the bell-crank to pivotally move the latter in a clockwise direction and this movement of the bell-crank through the linkage mechanism, including the link 52, brings about release of the latch mechanism holding the store to the aircraft.

To release the store 51 in the course of flight, it is merely necessary to close the firing circuit to detonate the cartridges mounted in the fittings 19. The gases generated by the rapidly burning explosive material causes the pressure in the combustion chamber and in the upper end of the power cylinder 14 to rise abruptly to a high magnitude. As a consequence, the downward thrust of the power piston 15 against the store increases rapidly to create the desired ejective force. At the same time, the auxiliary piston 59 moves downwardly in the cylinder 61 is response to the rising pressure, as above explained, and thereby moves the actuating link 52 to release the latch mechanism holding the store to the pylon.

To permit the springs 48 to return the power piston to its normal position after the store has been jettisoned, the combustion products are vented to the atmosphere. In the ejector mechanism herein shown this is brought about through the passage defined by the bore 36 of the plug 33, the tubular member 37, the passage of the hollow plug 31 and the bore 32 formed in the end wall of the sleeve 29.

In the now preferred practice of the present invention, the hollow plug 31 is slidably mounted in the bore 32 and is engaged by a coil spring 65 sleeving the tubular member 37 and compressed between the upper face of the plug 31 and a flat ring or the like 66 fixed to the tubular member 37 adjacent the normally lower end thereof. It will be seen that the spring 65 normally urges the plug 31 to a position within the bore 32 in which the head 67 of the plug engages the lower wall of the skirt 29. The plug 31 forms a part of a valve mechanism controlling the venting of the combustion products to the atmosphere and to this end the normally lower face of the plug 31 is formed with a conical seat adapted to be engaged by a conical head 68 of a pin 69 slidably mounted in the smaller diametered lower portion of the bore 32. The bore 32 is sealed by an O-ring 70 here shown as mounted in a groove formed in the wall of the bore 32. Thus the tubular member is sealed against escape of pressure into the hollow piston formed by the skirt or sleeve 29.

With the head 67 of the plug 31 engaging the lower wall of the skirt 29, the end of the pin 69 opposite to the conical head 68 projects downwardly beyond the projection 50, but when the store 51 is mounted and held to the pylon through the latch mechanism, the pin 69 is urged upwardly to in turn force the plug 31 upwardly against the action of the spring 65. This results, as will be understood, in very firm engagement between the conical head 68 and the correspondingly shaped seat formed in the lower wall of the plug 31.

It will thus be seen that so long as the store is mounted to the pylon, the bore of the tubular member 37 will be sealed and thus prevent combustion products generated by the detonation of the cartridges from venting into the atmosphere. Once the store has been ejected, however, the spring 65 returns the plug 31 to the position wherein the head 67 is again engaged with the wall of the skirt 29 and the high pressure acting against the conical head 68 of the pin will force the pin downwardly, as viewed in Figure 2, to allow the pressure and combustion products to dissipate through the laterally extending passages 71 communicating the bore 32 with the atmosphere. Once this is brought about, the spring 48 will quickly return the power piston to its normal position illustrated in Figure 1.

As the valve mechanism formed by the plug 31 and the head 68 remains open once the store has been ejected, any residual burning of the explosive grains of the cartridges will not produce pressure changes sufficient to move the piston against the action of the springs 48. This is so for the combustion products of such burning would be quickly dissipated to the atmosphere by way of the tubular member 37, the open valve 31, 68 and passages 71. As the valve is opened by movement of the store away from the pylon the valve coacts to permit rapid return of the piston as soon as the ejection of the store has been initiated.

As previously explained the piston for its overall size has a relatively low inertia thereby resulting in a faster acting piston to bring about the ejection of the store with minimum time lag once the cartridges have been detonated. Furthermore, the low weight factor is of extreme importance as it does not materially increase the weight penalty of the aircraft on which the ejector mechanism is installed. As the weight of the piston is held to a minimum the momentum of the piston is correspondingly reduced which allows deceleration of the piston with a low impact shock to the mechanism. In this connection, it is now preferred to mount a relatively large annular or toroidal member 72 of some suitable resilient material to the top face of the flange 43. The toroidal member 72 takes the direct action of the head element 27 and thus holds the element out of direct impact with the face of the flange 43. The member 72 thus further decreases the impact shock to the mechanism as the piston approaches the limit of its travel downwardly of the power cylinder.

Although the now preferred embodiment of the present invention has been shown and described herein, it is to be understood that the invention is not to be limited thereto, for it is susceptible to changes in form and detail within the scope of the appended claims.

I claim:

1. An apparatus for jettisoning a store mounted exteriorly of an aircraft by remotely operable latch means, comprising: a body member to be mounted to an aircraft and having a combustion chamber formed interiorly thereof; a cylinder communicating with said combustion chamber; a piston operating in said cylinder and movable therein for a limited distance in response to a steep-pressure rise produced by an explosive burning in said combustion chamber to exert thrust against said store; means defining a passageway longitudinally extending interiorly of said piston and flow-connecting said combustion chamber to the ambient atmosphere; valve means carried at the outer end of said piston including a pair of relatively movable members; resilient means normally urging one of said members to a limit position on said piston; the other of said members presenting a surface subject to said pressure rise and held in valve-closing position relative to said first named member against the action of said resilient means to close said passageway by a store mounted by said latch means to the aircraft, whereby said other member is moved to a valve opening position by said pressure rise as the latter moves said piston to apply an ejective thrust to said store.

2. An apparatus for jettisoning a store mounted exteriorly of an aircraft by remotely operable latch means comprising: means to provide fluid with a steep-pressure rise; a power cylinder adapted for communication with said fluid, said power cylinder having an outer open end; a piston including a head element and a depending sleeve of a length substantially equal to the length of said cylinder slidably mounted in the same; means carried within said cylinder at the outer end thereof adapted to be engaged by the head element of said piston for limiting movement of the latter outwardly of said cylinder; resilient means normally holding said piston in a retracted position; a tubular member coaxially mounted within said piston and forming a passageway extending longitudinally thereof, said passageway being flow-connected at one end thereof with said fluid; and at the opposite end with the ambient atmosphere; and valve means carried by said depending sleeve adapted to close the outer end of said passageway, including means adapted to be engaged by said store and held thereby in a valve closing position so long as said store is held by the latch means to said aircraft, whereby the ejection of said store opens said passageway to vent said pressure to atmosphere thereby permitting said piston to be returned to said retracted position.

3. An apparatus for jettisoning a store mounted exteriorly of an aircraft by remotely operable latch means comprising: means to provide fluid with a steep-pressure rise; a power cylinder adapted for communication with said fluid, said power cylinder having an outer open end; a piston including a head element and a depending sleeve of a length substantially equal to the length of said cylinder slidably mounted in the same; means carried within said cylinder at the outer end thereof adapted to be engaged by the head element of said piston for limiting movement of the latter outwardly of said cylinder; resilient means normally holding said piston in a retracted position; a tubular member coaxially mounted within said piston and forming a passageway extending longitudinally thereof, said passageway flow-connecting said fluid and the ambient atmosphere; and valve means carried by said depending sleeve adapted to close the outer end of said passageway, said means, including means forming a valve seat and relatively movable means adapted to be engaged by said store and held thereby in engagement with said seat to close said passageway so long as said store is held by the latch means to said aircraft, said movable means moving out of engagement by said pressure rise to open said passageway.

4. An apparatus for jettisoning a store mounted exteriorly of an aircraft, comprising: a body member to be mounted to the aircraft and having a combustion chamber formed internally thereof and forming means to provide fluid with a steep-pressure rise; a cylinder communicating at one end with said combustion chamber; a hollow piston member movably mounted in said cylinder to exert a thrust against said store for ejecting the same from said aircraft; a tubular member coaxially carried within said hollow piston member and forming a passageway extending longitudinally of said hollow piston; means for sealing the interior of said hollow piston from said passageway; a valve means normally closing said passageway; said valve means being adapted to open in response to a steep-pressure rise produced by expanding fluid within said combustion chamber and normally being in contact with said store with the latter blocking opening movement on the valve means whereby said valve means opens automatically to release said fluid when said store is ejected under the thrust of said piston.

5. An apparatus for jettisoning a store mounted exteriorly of an aircraft by remotely operable latch means, comprising: a body member to be mounted to an aircraft and having a combustion chamber formed internally thereof; a cylinder communicating with said combustion chamber; a piston operating in said cylinder and movable therein; means for limiting movement of said piston in response to a steep-pressure rise produced by an explosive burning in said combustion chamber said movement of the piston exerting an ejective thrust against said store; means defining a passageway longitudinally extending interiorly of said piston, said passageway being flow-connected at one end thereof to said combustion chamber; valve means carried at the opposite end of said passageway including a pair of relatively movable members; resilient means normally holding one of said members in a limit position on said piston; the other of said members presenting a surface at one end subject to said pressure rise and engaged at the opposite end by a store held to said aircraft by the latch means and held thereby in valve closing position relative to said first named member against the action of said resilient means; whereby said other member is moved to a valve opening position by said pressure rise as the same moves said piston to apply an ejective thrust to said store; and means for returning said piston from said limit position and for holding the same in a retracted position relative to said cylinder.

6. An apparatus for jettisoning a store mounted exteriorly of an aircraft, comprising: a body member to be mounted to the aircraft and having an internal combustion chamber forming means to provide fluid with a steep-pressure rise; a cylinder communicating at one end with said combustion chamber; a hollow piston member movably mounted in said cylinder; a projection carried by said piston at the end opposite said combustion chamber extending outwardly of said cylinder and adapted to engage said store and apply an ejective thrust thereto as the piston member moves in response to said steep pressure rise; a tubular member coaxially carried within said hollow piston member and forming a passageway extending longitudinally of said hollow piston; means for sealing the interior of said hollow piston from said passageway; valve means carried within said projection normally closing said passageway, said valve means including means engaged by and held in valve closing position by said store and movable to a valve open position in response to said steep-pressure rise, whereby the same opens said valve means as soon as said store is ejected under the thrust of said projection as the piston member moves in the cylinder in response to said pressure rise.

7. An apparatus for jettisoning a store mounted exteriorly of an aircraft, comprising: a body member to be mounted to the aircraft and having an internal combustion chamber forming means to provide fluid with a steep-pressure rise; a cylinder communicating at one end with said combustion chamber; a hollow piston member movably mounted in said cylinder; a projection carried by said piston at the end opposite said combustion chamber extending outwardly of said cylinder and adapted to engage said store and apply an ejective thrust thereto as the piston member moves in response to said steep-pressure rise; said projection having at least one passage leading to ambient atmosphere; a tubular member coaxially carried within said hollow piston member and having one end mounted within the passage of said projection, said tubular member forming a passageway extending longitudinally of said hollow piston and flow-connecting said combustion chamber with ambient atmosphere; means for sealing the interior of said hollow piston from said passageway; valve means carried within the passage of said projection normally closing the passageway of said tubular member, said valve means including a valvular element engaged by and held in valve closing position relative to a seat element by said store, said valvular element movable to a valve open position relative to said seat element in response to said steep-pressure rise, whereby the same opens said valve means as soon as said store is ejected under the thrust of said projection as the piston member moves in the cylinder in response to said pressure rise.

8. An apparatus as set forth in claim 7 in which said valve means comprises a hollow plug, mounted in the passage of said projection, slidably receives one end of said tubular member and includes the seat element formed at the one end thereof and in which the valvular element includes a head member engageable with said seat element and a pin projecting beyond said projection for engagement with said store.

9. An apparatus as set forth in claim 8 in which a spring normally holds said hollow plug in a limit position in said passage and acts to resiliently engage the seat element with said head member as said valvular element is urged inwardly of said passage by engagement of the pin thereof with said store.

References Cited in the file of this patent

UNITED STATES PATENTS 2,003,843    Temple _____ June 4, 1935

FOREIGN PATENTS 111,734    Sweden _____ Sept. 5, 1944
636,870    France _____ Jan. 16, 1928